June 1, 1948.　　　　E. F. CHANDLER　　　　2,442,398
FASTENING DEVICE
Filed Jan. 18, 1945　　　　　　　　　　2 Sheets-Sheet 1
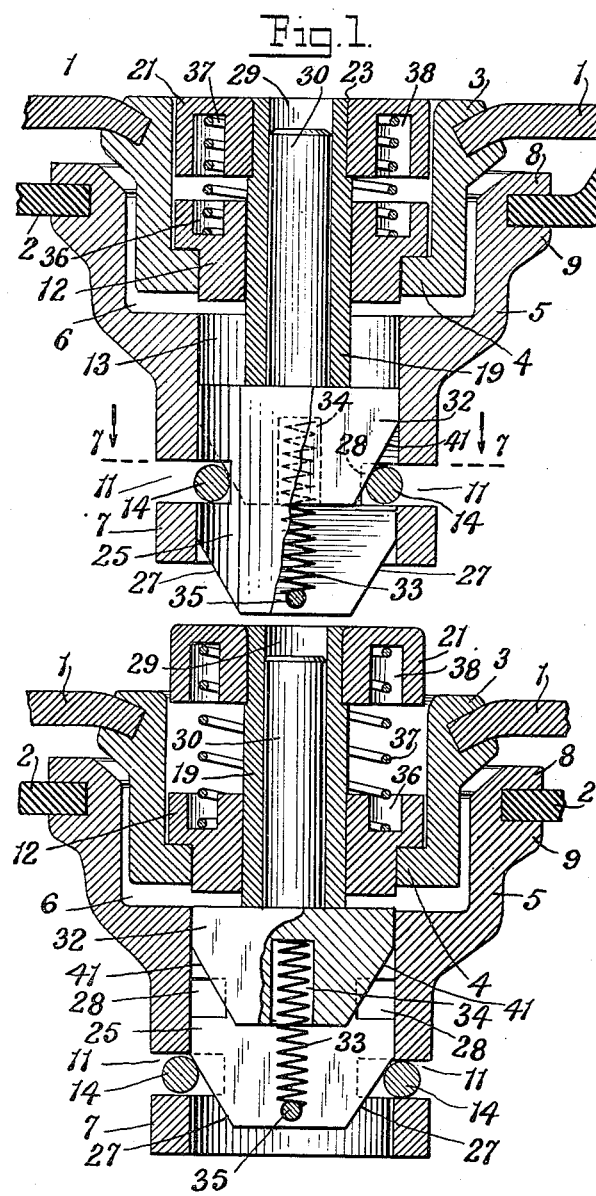
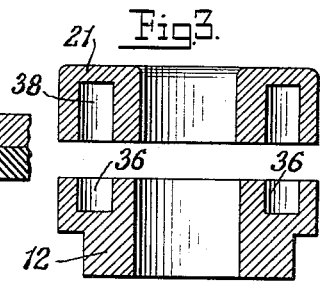
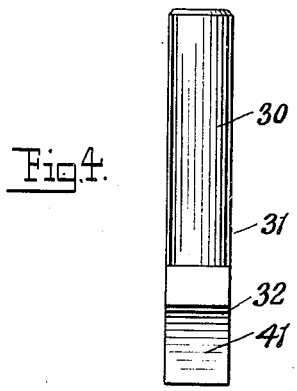
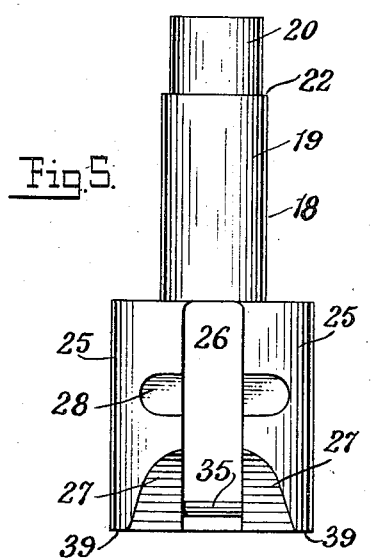
INVENTOR.
Edward F. Chandler
BY Harry Radzinsky
Attorney.

June 1, 1948. E. F. CHANDLER 2,442,398
FASTENING DEVICE
Filed Jan. 18, 1945 2 Sheets-Sheet 2
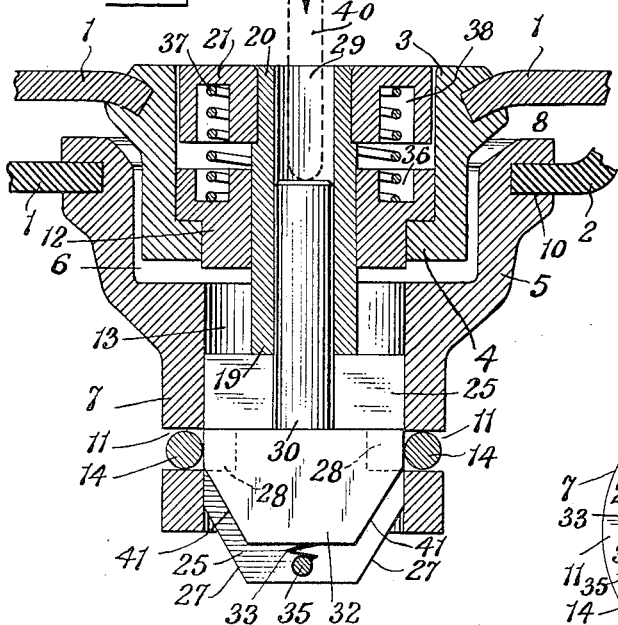
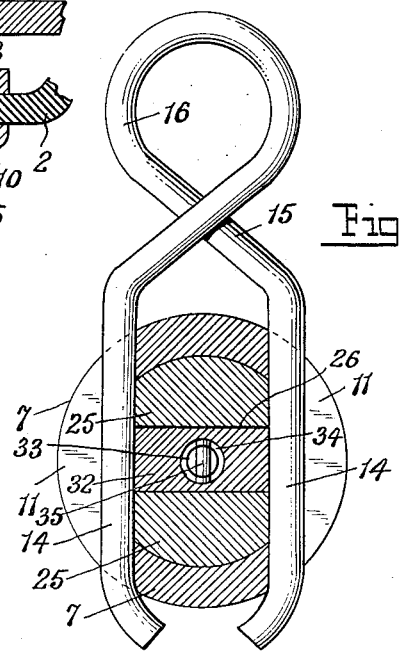
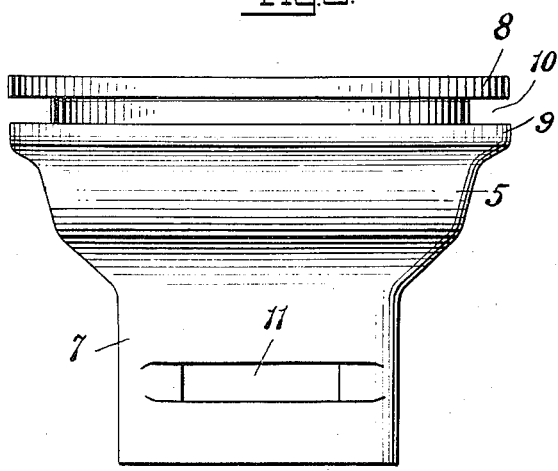
INVENTOR.
Edward F. Chandler
BY Harry Radzinsky
Attorney Patented June 1, 1948

2,442,398

UNITED STATES PATENT OFFICE 2,442,398

FASTENING DEVICE

Edward F. Chandler, Brooklyn, N. Y.

Application January 18, 1945, Serial No. 573,457

11 Claims. (Cl. 85—5)

This invention relates to fasteners for detachably securing one part to another, such as one plate, layer or ply of sheet material to another plate, layer or ply. Fasteners of this general class are widely used, at the present time, in aircraft cowling, and have a multitude of other uses.

Many fasteners of this character require special tools for their application and removal; others are of such construction that they are likely to be inadvertently opened by vibration or by other causes, and still others require a precise interlock of parts which necessitates care and special skill in making and applying them.

An object of the present invention is to provide a fastener of relatively inexpensive construction, but one which will be strong and dependable and which can be locked and unlocked without the use of special tools or equipment.

More particularly, the invention contemplates the provision of a socket member adapted to be attached to one of the layers or plies, and provided with a pair of resilient or spring legs normally entering an axial passage in the socket member and resiliently engaging a recessed locking member having parts engaging a grommet secured to a second layer or ply. The invention also includes a release member axially movable within the locking member and manually slidable, when it is desired to unlock or release the fastening device, to spread the resilient leg portions apart and thereby disengage them from the locking member and permit the locking member and associated parts to be removed from the socket member.

In the accompanying drawings, wherein an illustrative embodiment of the invention is disclosed, Fig. 1 is a vertical sectional view, with parts broken away, of a fastener constructed in accordance with the invention, the fastener being shown in closed or locked condition; Fig. 2 is a similar sectional view, showing the locking member and associated parts being inserted into the socket or receptacle; Fig. 3 is a sectional view through the outer end or head of the fastener and the collar; Fig. 4 is an elevation of the release member; Fig. 5 is an elevation of the locking member; Fig. 6 is a vertical sectional view through the fastening device, showing how the same is unlocked by pressure imposed on the stem of the release member; Fig. 7 is a sectional view on the line 7—7 of Fig. 1, looking in the direction of the arrows, and Fig. 8 is a side elevation of the socket or receptacle for the fastener.

In describing the operation of the fastening device, it is assumed that the same is to be employed for securing together two layers or plies of sheet material, one of these layers or plies being indicated at 1, and the second or inner layer, being indicated at 2. The outer layer 1 is provided with a grommet 3 secured to and extending through it, said grommet being provided at its inner end with an inturned annular flange 4 constituting a seat for a collar 12 to be later described. The inner layer or ply 2 is secured to a socket member or receptacle 5 for the fastener by being pinched in the space 10 between the annular flanges 8 and 9 of the socket member 5. The socket member consists of a cup-shaped element having an internal recess 6 communicating with the axial passage 13 of a cylindrical part 7 of the socket member.

At diametrically opposite points, the cylindrical extension 7 of the socket 5 is formed with transversely extending slot-like apertures 11 for the reception of the legs 14 of a wire spring member or clip 15 of hair-pin like formation. The spring legs 14 of said clip are constantly urged toward one another by means of the spring loop 16, as shown in Fig. 7. The result of this arrangement is that the two spring legs 14 are urged inwardly in a direction toward the inner ends of the apertures or slots 11, and they thus extend into the passage 13.

Adapted to slide axially in the passage 13 of the socket 5 is a locking member 18. Said member has a tubular shank portion 19 from which a reduced neck 20 (Fig. 5) extends. Said neck 20 receives a fixed cap or head 21 of annular form, which rests against the shoulder 22 on the shank 19 and the end of the reduced part is out-turned as indicated at 23 so that the cap 21 is thus fixedly maintained on the end of the shank 19 between the shoulder 22 and the outturned end portion 23.

At its opposite end the shank 19 is provided with an integrally formed bifurcated cylindrical head 25 which closely fits within the passage 13 of the socket or receptacle 5 and is slidable therein. The head 25 is bifurcated or split vertically, as indicated at 26. At its lower part, the head 25 is provided with the diametrically opposite angular cam surfaces 27 which, at certain times, are operative against the spring legs 14 to spread the same apart to an extent required to permit the locking member 18 to move to a position to have recesses formed in it to engage the spring legs 14. At diametrically opposite points, and above the cam surfaces 27, the head 25 is provided with the transversely extending recesses 28 for engagement by the spring legs 14 when the fastening device is in closed or locked position as clearly seen in Fig. 1.

The shank 19 of the locking member 18 is tubular, and is thus provided with a longitudinally extending central passage 29 within which is disposed a stem 30 of a release member 31, said stem being provided at its lower end with a head 32 fitting slidably in the slot 26 between the two halves of the head 25 of the locking member. Head 32 of the release member 31 is formed with two angular cam surfaces 41 which, when it is desired to unlock or release the fastener, are operative against the spring legs 14 to distend or spread the same apart to an extent required to disengage them from the recesses 28 in the head of the locking member. The release member 31 is normally urged upwardly, or to an inoperative position, by means of a coil spring 33 which rests in a recess 34 in the under side of the head 32, and has its opposite end bearing against a cross pin 35 that extends between the two halves of the head 25 and thus bridges the slot 26.

Surrounding the shank 19 between the cap 21 and the head 25, and slidably mounted on the shank, is a collar 12 that is formed with an annular recess 36 constituting a seat for a coil spring 37 which has its upper end extending into an annular recess in the under side of the cap 21.

From the foregoing, the operation of the fastening device will be readily understood. It is assumed that it is desired to detachably unite a layer of sheet material 1 to an underlying layer 2, by means of the fastening device. The outer layer 1 is provided with the grommet 3 adapted to fit into the recess 6 of one of the sockets or receptacles 5. The socket or receptacle is attached to the inner layer or ply 2 at the proper location in the manner previously described. The locking member 18, within which is located the release member 31, and carrying the cap 21 and collar 12, with the spring 37 located between the cap and collar, constitutes an assembly of elements or a unit which I refer to herein as the "fastening assembly." This assembly is now inserted in the socket or receptacle 5 in the manner shown in Fig. 2. As these parts are pressed inwardly, or toward the cylindrical inner extension 7 of the socket 5, the cam surfaces 27 on the head 25 of the locking member will come into contact with the spring legs 14 and spread them apart to an extent required to permit the head 25 to enter through the cylindrical portion 7 until the recesses 28 in the head 25 of the locking member come into registration with the recesses or apertures 11, whereupon the spring legs 14 will snap inwardly and will enter into the recesses 28, thus engaging the head 25 and preventing it from moving axially. This is the closed or locked position of the fastener. At this time it will be observed that the collar 12 has seated against the inturned flange 4 of the grommet 3 and is being held firmly against the same, thus forcing the grommet inwardly toward the base of the recess 6. The parts are shown in separated relation in the drawing, but are actually held in resilient contact in actual practice.

It will sometimes occur, when inserting the fastening assembly in the socket or receptacle 5, that the cam surfaces 27 on the head 25 are so disposed in relation to the positions of the spring legs 14, that they will not come into contact with the legs but instead, the surfaces 39 on the head 25 will be brought into contact with the spring legs 14. In such case, when it is found that the fastening assembly will not enter into the socket to the required extent, it is merely rotated slightly until it can be pushed inwardly until the cam surfaces 27 come into contact with the spring legs 14 to spread the same apart as previously described.

In Fig. 1 the fastening device is shown in closed or locked position, at which time the spring legs are resiliently engaging the recesses 28 in the head 25, thus maintaining the fastening assembly against axial movement. To open the fastener and enable the fastening assembly, consisting of the connected parts 18, 30, 12, 21, 33 and 37, to be lifted out of the socket 5, merely requires the application of pressure on the end of the stem 30 of the release member 31 by means of any small implement capable of entering the passage 29 to engage against the end of the stem 30 of the release member 31 in the manner indicated at 40 in Fig. 6. When the stem 30 is pressed axially, or in the direction of the arrow in Fig. 6, it will move the head 32 toward the spring legs 14 to bring the cam surfaces 41 thereon into contact with the spring legs 14, causing them to be spread apart as shown in Fig. 6, and moved out of the recesses 28 in the head 25 of the locking member and held out of said recesses as long as the stem 30 is depressed. With the spring legs 14 thus held in spread position and out of the recesses 28, the entire fastening assembly can be lifted out of the socket 5.

It will be clear that I have provided a fastening device having a fastening assembly which is fitted into place in a socket to enable the fastener to be closed or locked by simply pushing the fastening assembly into position in the socket until it clicks into engagement with the spring legs which engage it with a positive and certain connection. Similarly, the fastening assembly can be removed by simple inward pressure on the release member by any suitable implement, such as a nail or other readily available small pointed object. At the same time, it will be noted that the stem 30 of the release member is situated within the protective tubular shank 19, and that it has its end located well within the body of the shank so that the end of the stem 30 is not readily available to inadvertent or accidental pressure.

While I have described the parts of the fastening device as being of certain forms and shapes, it will be apparent that a departure therefrom may be readily made according to the uses to which the device may be put, or the environments in which it might be used.

What I claim is:

1. In a fastener of the character described, a socket, a locking member slidable in the socket, a release member carried by and slidable within the locking member, spring means on the socket for engaging the locking member and holding it against axial movement relative to the socket, cam means carried by the release member for forcing the spring means out of engagement with the locking member when said release member is moved axially within the locking member, and means carried by the locking member for normally holding the release member in an inoperative position.

2. A fastener of the character described comprising, a socket member having a passage, a locking member having a tubular shank and a head slidable in the passage, said head having a plurality of transverse recesses, the socket member having a plurality of apertures, spring elements located in said apertures and entering the passage in the socket and adapted to fit into the recesses in the head to thereby hold the locking member against axial movement within the socket, cam surfaces on the head adapted to spread the spring elements apart when the head is thrust in one direction into the socket, and a release member wholly contained within and carried by the locking member, said release member being axially movable within the tubular shank and having cam means adapted to spread the spring elements apart to thereby force said spring elements out of the recesses in the head to free the locking member and permit its removal from the socket.

3. In a fastening device of the character described, a socket, a spring carried thereby, a locking member slidable axially within the socket and having recesses for engagement with parts of the spring, a release member slidable axially within the locking member and provided with means for engagement with the spring to move parts of the spring out of engagement with the recesses in the locking member when the release member is moved axially, and resilient means for normally maintaining the release member inoperative relative to the spring.

4. In a fastening device, a socket member having a cylindrical portion provided with diametrically opposite apertures in its wall, a spring clip having leg portions normally urged toward one another, said leg portions being located in the apertures and extending into the interior of the cylindrical portion, a slidable locking member, an inner head on the same located in the cylindrical portion of the socket, said inner head having cam surfaces for spreading the leg portions apart when it is entered into the cylindrical portion, said inner head also having recesses for engagement with the leg portions of the spring clip to thereby restrain the locking member against axial separation from the socket, said inner head being split to divide it into two halves, a release member having a stem portion slidable within the locking member and having a head portion slidable between the two halves of the head of the locking member, the head on the release member having cam surfaces for engagement against the spring leg portions when the release member is pushed inwardly, to thereby force the spring legs out of the recesses in the inner head and permit separation of the locking member from the socket.

5. In a fastening device of the character called for in claim 4, wherein spring means is provided for maintaining the locking member in an inoperative position, and the locking member is provided with an annular cap at one end and a movable collar, and a spring interposed between the cap and the collar.

6. In a fastening device, a cup-shaped socket member having an axially extending passage, the wall of said passage being apertured at a plurality of points, a spring clip having leg portions disposed in said apertures and entering into the passage, locking means slidably mounted in the passage and including an outer member having a head at one end provided with recesses for engagement with the leg portions of the clip, said head also having cam surfaces for spreading the leg portions apart on entry of the head between said leg portions, a release member slidably mounted within the outer member, said release member having cam surfaces also operative against the leg portions to spread the same apart when the release member is depressed within the outer member, and spring means for maintaining the cam surfaces on the release member in an inoperative position relative to the leg portions.

7. In a fastening device, an apertured cup, a spring having legs entering the apertures and exposed on the inside of the cup, a slidable locking member entering the cup and having recesses engaging the spring legs, a release member slidable within the locking member and having cam surfaces for engaging the spring legs to move the same out of the recesses in the locking member when it is desired to lift the locking member out of the cup, and resilient means carried by the locking member and operative against the release member to hold the cam surfaces of the release member away from the legs of the spring.

8. In a fastening device of the character described, a grommet having an inturned annular flange forming a seat, a cup-shaped socket member receiving said grommet, said socket member having a central passage, a spring clip having a pair of legs normally urged toward one another, the socket member having apertures in its side wall in which said legs are located to position parts of said legs within the socket, a locking member slidable within the central passage of the socket and having recesses for engagement with the parts of the spring legs located within the socket, a tubular shank on the locking member, an annular head at one end of the tubular shank, a collar slidable on said shank and adapted to rest against the flange on the grommet, a spring interposed between the collar and the annular head, a release member having a stem located within the tubular shank and axially movable therein, said stem having a head located between parts of the locking member, said head having cam surfaces for engagement with the spring legs upon depression of the stem, for causing the legs to spread apart and be sprung out of the recesses in the locking member.

9. In a fastener, a socket having a passage extending through it, spring members on the socket projecting into the passage, a locking member slidable in the passage and recessed to engage the spring members, a slidable release member having means for engaging the spring members to disengage them from the recesses in the locking member when the release member is manually moved in a direction toward the spring members, and means for normally holding the release member in an inoperative position.

10. In a fastening device of the character described, a socket, a spring carried thereby, a locking member slidable axially within the socket and having recesses for engaging parts of the spring, a release member carried by the locking member and caused to enter the socket when the locking member is inserted within the socket, said release member having releasing means for engaging the spring and forcing the spring out of engagement with the recesses in the locking member when the release member is moved axially of the locking member, and resilient means for engaging the release member and normally holding the release means thereof away from the spring.

11. In a fastening device as provided for in claim 10, wherein the locking member has a tubular shank through which the release member is slidable, and the release member has a head normally held against one end of said shank by the resilient means.

EDWARD F. CHANDLER.

REFERENCES CITED

The following references are of record in the file of this patent:

UNITED STATES PATENTS

| Number | Name | Date |
|---|---|---|
| 203,308 | Wood | May 7, 1878 |
| 1,309,382 | Wilson | July 8, 1919 |

FOREIGN PATENTS

| Number | Country | Date |
|---|---|---|
| 438,996 | Germany | Dec. 31, 1926 |